United States Patent Office 3,450,796
Patented June 17, 1969

3,450,796
PRODUCTION OF THERMOPLASTIC POLYMERIC MATERIALS
Brian Philip Griffin, Welwyn Garden City, England, assignor to Imperial Chemical Industries Limited, London, England, a corporation of Great Britain
No Drawing. Continuation-in-part of application Ser. No. 293,194, July 5, 1963. This application June 19, 1968, Ser. No. 738,125
Claims priority, application Great Britain, July 9, 1962, 26,214/62
Int. Cl. C08f 3/68, 3/64
U.S. Cl. 260—885                                       19 Claims

ABSTRACT OF THE DISCLOSURE

Craze resistant methyl methacrylate copolymer are prepared by polymerizing (A) methyl methacrylate monomer in an aqueous suspension polymerization process in the presence of (B) a cross linked copolymer prepared by emulsion polymerization of (1) methyl methacrylate in the presence of a cross linked alkyl acrylate polymer or (2) alkyl acrylate and a cross linking monomer in the presence of polymeric methyl methacrylate. The final polymer has been polymerized in three continuous stages the first two of which are emulsion polymerization, the third being a suspension polymerization.

---

This is a continuation-in-part of my prior application Ser. No. 293,194 filed July 5, 1963 now abandoned.

The present invention relates to improvements in the production of thermoplastic polymeric materials, particularly in the production of polymeric materials derived mainly from methyl methacrylate.

Polymethyl methacrylate is widely used in the form of granules of molding powder to manufacture useful articles by, for example, injection or extrusion molding processes. Among the many articles which may be made from this material are, for example, reflex reflectors, rear lamp housings for motor vehicles, telephones, implosion guards for television tubes, vacuum jugs, fountain pens and lighting fittings. Articles such as these molded from polymethyl methacrylate granules or molding powders are widely used at the present time and give extremely satisfactory service.

Polymethyl methacrylate is a particularly useful material to use for the manufacture of articles of this kind because it is highly transparent, strong, and does not discolor readily when exposed to sunlight. For certain applications a higher resistance to impact would be an advantage. Also, if certain liquids are brought into contact with articles made from polymethyl methacrylate the phenomenon of surface crazing may appear and the surface becomes covered with very fine lines. Some organic solvents induce this phenomenon, as also may repeated exposure to aqueous detergents or even warm water. In view, therefore, of the considerable technical merits of polymethyl methacrylate as a material for making molded articles of great utility, it would be an advantage if the tendency to craze under certain conditions could be completely eliminated, or at least reduced.

An object of this invention is to provide a process whereby granules or molding powders derived mainly from methyl methacrylate may be made which have an improved resistance to breakage on impact. It is a further object to provide granules or molding powders derived mainly from these monomers which may be molded to form articles having a reduced tendency to craze on exposure to aqueous detergents, whether or not these articles have an improved resistance to breakage on impact. It is a still further object to provide such granules or molding powders derived particularly from methyl methacrylate that have excellent stability to outdoor exposure.

According to the present invention, there is provided a process for the production of polymeric material in granular form which comprises suspension polymerizing at a temperature of about 40 to about 140° C., in aqueous dispersion, and in the presence of a monomer soluble catalyst monomeric material (C) which is methyl methacrylate together with from 0 to 15% by weight of (C) of at least one lower alkyl acrylate in which the alkyl moiety of the ester molecule contains from 1 to 8 carbon atoms, and 0 to 5% of at least one copolymerizable ethylenically unsaturated compound containing at least two

groups per molecule selected from the group consisting of glycol dimethacrylate, divinyl benzene, vinyl methacrylate, methylene dimethacrylate, allyl methacrylate, diallyl phthalate, diallyl maleate, allyl acrylate, methallyl acrylate, butadiene-1,3, isoprene and 2-chlorobutadiene, in the presence of a cross-linked copolymer Y selected from the group consisting of:

(1) polymers obtained by polymerizing to substantial completion by aqueous emulsion polymerization in the presence of water soluble catalyst of said monomeric material (C) in the presence of a polymer X obtained by polymerizing a monomer mixture (A), consisting essentially of:
  (a) at least one lower alkyl acrylate containing from 1 to 8 carbon atoms in the alkyl moiety of the ester molecule,
  (b) 0 to 50% by weight of said alkyl ester of another different copolymerizable monoethylenically unsaturated compound, and
  (c) from 0.1 to 10% by weight of total monoethylenically unsaturated monomer of (A) at least one copolymerizable compound containing at least two

groups per molecule selected from the group consisting of glycol dimethacrylate, divinyl benzene, vinyl methacrylate, methylene dimethacrylate, allyl methacrylate, diallyl phthalate, diallyl maleate, allyl acrylate, methallyl acrylate, butadiene-1,3, isoprene and 2-chlorobutadiene, (2) polymers obtained by polymerizing to substantial completion by aqueous emulsion polymerization in the presence of a water soluble catalyst of said monomer mixture (A) in the presence of a polymer obtained by polymerizing said monomeric material (C), the polymeric product containing 5 to 50% of material derived from said monomer mixture (A).

Examples of materials that may be used in the process include the following:

Group A (1) Alkyl acrylates

Methyl acrylate, ethyl acrylate, propyl acrylate, butyl acrylate and 2-ethyl-hexyl acrylate.

(2) Polyfunctional polymerisable compounds

Glycol dimethacrylate, divinyl benzene, vinyl methacrylate, methylene dimethacrylate, allyl methacrylate, diallyl phthalate, diallyl maleate, allyl acrylate, methallyl acrylate, butadiene-1,3, isoprene and 2-chlorobutadiene.

(3) Additional monoethylenic monomeric materials which may usefully be present in proportions of up to 50% by weight of the alkyl acrylate:

Methyl methacrylate, methacrylic acid, acrylamide, methacrylamide, styrene, alkyl substituted styres, e.g. α methyl styrene and α chlorostyrene, acrylonitrile, methacrylonitrile, glycydyl methacrylate, hydroxy ethyl methacrylate, acrylic acid, crotonic, maleic, fumaric and itaconic acids, 2-vinyl pyridine, 4-vinyl pyridine, N:N-dimethylamino-ethyl methacrylate, vinyl phthalimide, N-tert-butyl acrylamide and di-N-ethyl acrylamide.

Group C
(1) Methyl methacrylate
(2) Alkyl acrylates

These include any of the alkyl acrylates mentioned in group A.

(3) Polyfunctional polymerizable compounds

Any of the polyfunctional polymerizable compounds mentioned under group A may be used.

The process thus consists essentially in the polymerization of methyl methacrylate in aqueous dispersion in the presence of the product obtained by the two stage consecutive polymerization and which includes a partially cross-link polymer or copolymer of a lower alkyl acrylate. The polymerization process of this invention is a suspension polymerization process which is a process that is well known in the polymer art, and normally consists in dispersing a liquid monomer in an aqueous phase with stirring to form a dispersion of monomer droplets in the aqueous phase. The suspension is normally stabilized by the presence of a dispersing agent, examples of which include gelatin, starch, methyl cellulose, polyvinyl alcohol, salts of polyacrylic and polymethacrylic acids and certain inorganic colloidal materials, e.g. hydrated magnesium silicates. Catalysts that are soluble in the monomer are also used, examples of which include benzoyl peroxide, lauroyl peroxide and the azo catalysts of which αα'-azodiisobutyronitrile is an example. The suspension polymerization process is to be distinguished from an emulsion polymerization process in which the monomer droplets are maintained in emulsified form by an emulsifying agent and the product is a stable emulsion. In the suspension polymerization process the product is an unstable dispersion of polymer particles in water, and these particles can be isolated by filtration.

In preparing the polymers used in the suspension polymerization process, or in carrying out that process, the molecular weight of the polymers may be controlled in known manner. A preferred method is to include in the polymerization mixture a chain transfer agent, particularly for example an aliphatic mercaptan e.g. lauryl mercaptan, in an amount of from 0.05 to 1.0% by weight of the polymerizable ingredients of the mixture.

The polymerization mixture in the suspension polymerization process is contained in a stirred reaction vessel which may be sealed or left open to the atmosphere in which case a reflux condenser should be used, and heated to the desired reaction temperature. The process may be carried out, for example, at temperatures of 40–140° C., the most useful range for convenience and speed being from 70–90° C.

Since the polymer present in the suspension polymerization is obtained in the form of stable aqueous latex of fine particles, the monomers to be polymerized in the presence of this polymer may be dispersed in the latex by stirring and with the assistance of a dispersing agent to form a dispersion which can then be subjected to the appropriate conditions, e.g., heat, in order to effect the suspension polymerization of monomeric ingredients. This stable latex may advantageously be obtained by polymerizing the initial monomer by an emulsion polymerization process to form a stable latex then dispersing the monomer required to form a stable emulsion in the polymer latex, and subjecting this added monomer to polymerization conditions so that the product is in the form of a stable emulsion. This polymer emulsion is then used as the vehicle in which the monomer to form the final product is dispersed with a dispersing agent, and in which the final suspension polymerization process is carried out. The conditions for carrying out such a two stage polymerization process in aqueous emulsion are well known in the art. Emulsion polymerization is normally carried out by dispersing the monomer in an aqueous phase containing a dissolved polymerization catalyst and an emulsifying agent to form a stable emulsion and then allowing polymerization to continue, e.g. by means of heat. Suitable catalysts include, for example, the water soluble persulphates, e.g. potassium and ammonium persulphates, and examples of emulsifying agents among the many normally used are sodium stearate, potassium and sodium oleates, and sodium lauryl sulphate.

The amounts of the various ingredients of the suspension polymerization process may be varied to produce polymers of different properties. As the amount of the polyfunctional monomer that is polymerized in admixture with the lower alkyl acrylate is increased, the impact resistance of the final polymer often increases. Normally, however, to obtain good combination of high impact strength, good craze resistance and molding properties the amount of polyfunctional monomer used is preferably from 0.1 to 5% by weight of the monomeric mixture containing the alkyl acrylate, i.e. the monomers of group A. The product of the two stage polymerization process is particularly useful in the suspension polymerization where the final product of the process is required to have a high mechanical strength; this may be necessary where the final product is to be used for example in injection molding.

It is preferred in general that the same monoethylenically unsaturated monomeric material should be used, at least mainly, both in the production of polymer Y and in the suspension polymerization process. The reason for this preference is that the use of such similar monomeric material to form the initial polymer Y and in the suspension polymerization step, normally leads to polymer having the best mechanical strength and compatibility. Thus, since polymer Y is derived in part from monomeric material selected from group A, then it is preferred that in the polymerization step of the suspension process the monomeric material selected from Group C polymerized in the presence of polymer Y while dispersed in water, should consist as much as possible of the same monoethylenically unsaturated monomeric material from which polymer Y is derived.

In order to obtain the final polymer having good molding properties, it is preferred where a mixture of monomeric material is selected from group C and contains one or more copolymerizable compounds containing at least two

groups per molecule, that such materials should lead to the formation of a minor proportion of the polymeric components of our final polymer. To obtain this result, the actual proportion of such materials that are selected from group C and used in the process will depend upon the proportion of the polyfunctional monomer present in the mixture, and the molding properties of the final polymer can therefore be modified at least in part, by varying the amount of the polyfunctional monomer.

The use of methyl methacrylate as the monomeric material selected from group C either wholly or at least mainly and so far as the monoethylenically unsaturated component of the material selected from group C is concerned, in the production of polymer Y and in the suspension polymerization process, leads to the production of a final polymer that has extremely good stability to outdoor exposure.

As hereinafter explained, it is preferred under certain conditions that the monomeric materials selected from group C should contain small proportions of monoethylenically unsaturated monomers other than methyl methacrylate.

Where the polymer selected for use in the suspension polymerization process is a polymer Y obtained as being a copolymer of group A as the initial material, it was found that in general as the proportion of monomer used in the second stage of the two stage process for making polymer Y is increased, the final product of the process becomes harder and more transparent and its softening point increases. Its molding properties also tend to improve. It is necessary to balance the improvement in these properties with the requirement for good impact resistance and craze resistance. Therefore, for the best combination of properties viz: hardness, strength, impact resistance, craze resistance, transparency and high softening point, it is preferred that the amount of monomer used in the second stage of such a two stage consecutive polymerization process to produce the polymer for use in the granular polymerization process should either not greatly exceed the amount of lower alkyl acrylate or should be a smaller amount than the amount of lower alkyl acrylate used in the first stage. These conditions apply equally where polymer Y is prepared by polymerizing monomeric material selected from group A in the presence of the product obtained by polymerizing monomeric material selected from group C. The particular preferred amount is that in polymer Y, for each 100 parts by weight of the lower alkyl acrylate from which said polymer Y is derived, there should be from 19–300 parts by weight of other monoethylenically unsaturated monomer from which polymer Y is derived, the amount depending upon the particular lower alkyl acrylate used.

In general, it is not possible to combine in one polymer the maximum resistance to crazing and the maximum impact strength together with good surface hardness and high softening point. Accordingly, in order to obtain the best resistance to crazing, it is preferred that the final polymer should contain from 5–15% of its weight of the polymeric material derived essentially from the lower alkyl acrylate, i.e. polymeric material obtained from the monomers of group A. Up to 95% by weight of the polymeric material derived from the monomers of group A may be present in the final product, but where the best combination of impact resistance, surface hardness and high softening point is required, it is preferred that the final polymer should contain from 15–50% by weight of the polymeric material derived from the monomers of group A. For the most useful combination of properties, i.e. in respect of impact strength and resistance to crazing, it is preferred that the final polymer should contain from 10 to 30% of its weight of polymer units derived from the monomeric material of group A.

In general, where the preferred amounts of monomeric material selected from group A are used, the nature of the final polymers will be determined largely by the monomeric materials selected from group C. It is for this reason that the monomeric material selected from group C should preferably consist at least mainly of methyl methacrylate because the polymers derived from this monomeric material have such great utility. In addition to the enhancement of the properties of the final polymer by means of the monomeric material selected from group A, it is also possible to further modify the properties of the final polymer by including in the monomeric material selected from group C small amounts of monomeric material additional to the methyl methacrylate. Particularly useful additional monomeric materials to add are those that when polymerized alone give softer polymers than polymethylmethacrylate because the presence of such additional material leads to the production of a final polymer in a form that flows easily without decomposition when subjected to molding temperatures and pressures. Particularly useful monomeric materials to be used for this purpose are the lower alkyl acrylates in which the alkyl part of the ester molecule contains from 1 to 8 carbon atoms, and useful amounts in which these materials can be included in the monomeric materials selected from group C are from 1 to 15% by weight of the said selected materials. Where in carrying out the suspension polymerization process the monomeric material selected from group C is mainly methyl methacrylate then it was found that the presence of said alkyl acrylates in the proportions of 1 to 15% of the monomeric material selected from said group, and preferably when the remainder is substantially all methyl methacrylate (allowing in the case of monomeric material selected from group C for the possible presence of a small proportion of polyfunctional monomeric material), the final polymer has good molding properties when subjected to presure at the molding temperature. The presence of 1 to 5% by weight, particularly of ethyl acrylate, is particularly effective in achieving this result where the selected monomeric material is mainly methyl methacrylate.

Other ingredients may also be added to the reaction mixture at any convenient stage, for example in order to control the molecular weight of the final polymer it may be desired to carry out the polymerization reaction in the presence of a chain transfer agent. Other ingredients that may be added to the reaction mixture include, for example, components such as stearic acid or stearyl alcohol which have a favorable effect upon the molding properties of the final polymer, and stabilizers including antioxidants and ultra-violet light absorbers. Surface active agents, latex coagulating agents and aqueous phase inhibitors can be used to control the size and nature of the polymer particles.

The dispersed polymer particles resulting from the suspension polymerization process are normally solid, roughly spherical particles of polymer having a weight average particle size of 50 to 500 microns. They can be separated from the aqueous phase by filtering or by centrifuging, and after washing and drying they may be used for molding purposes in that form. Alternatively, they may be converted to a granular form, e.g. by extruding the powder to form laces or rods and cutting the laces or rods into short lengths. This second stage may be carried out when it is desired to compound the powder with pigment to form a pigmented molding material.

The molding powders or granules made according to this invention may be used in the production of many different kinds of useful articles and components by shaping, molding, extruding or injection molding. Because of their particularly good resistance to crazing when brought into contact with aqueous detergents they can be used in the manufacture of such articles as wash hand basins, baths and sinks. Articles molded from these polymeric materials also possess superior weathering properties. Components made from these products may form parts of other finished articles.

The invention is more particularly described in the following examples in which all parts are given by weight. In these examples all the polymerization reactions were carried out in sealed stirred autoclaves that had been purged with nitrogen except where the reaction was carried out under reflux.

EXAMPLE I

Stage A

To water (1,000 parts) containing sodium hydroxide (0.5 part) disodium hydrogen phosphate (10 parts) and potassium persulphate (0.5 part) were added stearic acid (10 parts), ethyl acrylate (74.2 parts) and glycol dimethacrylate (0.8 part), all at 20° C. The mixture was heated to 55–60° C. in a sealed autoclave and after 10 minutes the temperature was raised to 100° C. over 30 minutes.

Stage B

When the reaction was substantially complete (further 10 minutes), the mixture was cooled to below 80° C. and up to 75 parts of a mixture of methyl methacrylate and ethyl acrylate (in the ratio by weight of 97 MMA:3 EA) were added. The temperature was again raised to 100° C., over 20 minutes and maintained at this temperature until polymerization of the monomers was substantially complete.

Stage C

After cooling to below 80° C., water (1,000 parts) containing 0.6 part of sodium polymethacrylate, monosodium dihydrogen phosphate (5 parts), disodium hydrogen phosphate (1 part) and sufficient of a 97:3 methyl methacrylate/ethyl acrylate mixture to make the monomeric and polymeric components total 1,000 parts by weight were added. In this mixture was dissolved tertiary dodecyl mercaptan (10 parts) and lauroyl peroxide (5 parts). The reaction was maintained at 80–85° C. After about 1–1.25 hours the reaction subsided and the temperature was then raised to 100° C. for 20 minutes. After cooling, the granular product was filtered off, washed and dried.

The product could be injection molded to give translucent moldings of better toughness and detergent craze resistance than normal injection molding grade polymethyl methacrylate. The ethyl acrylate in the initial polymerization (Stage A) could be partially replaced by styrene or acrylonitrile to give useful products. Disc injection moldings (4" diameter x 1/8") were tested for craze resistance by immersion in a 1% commercial detergent consisting of an alkyl phenol alkylene oxide condensate solution at 65° C. for 24 hours. The specimen was then removed and dried over silica gel for 24 hours. The area of each molding that crazed was measured. The strength (across flow direction), hardness and softening point of each molding was also measured. Table 1 lists properties of materials made by this procedure, including materials obtained by modifying the monomeric components of the copolymer.

maintained at reflux until the polymerization reaction was complete.

Stage C

Finally water (100 parts) containing the sodium salt of a 50:50 copolymer of methyl vinyl ether and maleic anhydride (0.6 part), disodium hydrogen phosphate (1 part) and 5.8 parts monosodium dihydrogen phosphate dihydrate was added followed by methyl methacrylate (425 parts), ethyl acrylate (13.5 parts), lauroyl peroxide (2 parts) and tert-dodecyl mercaptan (7.5 parts). The stirred suspension was heated to 80° C. and after 1.5 hours a fine granular product was isolated as in Example I.

On injection molding it gave hard rigid translucent moldings which were not crazed when tested with the detergent as described in Example I. The molding had Vicat softening point 99.2° C. and an energy to break of 10 ft. lb./in.$^3$ (maximum stress at break 8,000 p.s.i.).

In a modification of this example, the procedure was carried out as before but with the addition of 0.1 part of divinyl benzene to the monomers added at stage B. The product gave similar translucent, craze resistant moldings of Vicat softening point 103° C. and flexural strength of 11,200 p.s.i. and energy to break of 73 ft. lb./in.$^3$.

EXAMPLE III

To water (1,000 parts) containing sodium hydroxide (0.5 part), potassium persulphate (0.5 part), disodium hydrogen phosphate (1 part) and stearic acid (10 parts) were added 100 parts 2-ethyl hexyl acrylate and glycol dimethacrylate (4 parts). The temperature of the mixture was raised to reflux over a half an hour and after 2 further hours the polymerization reaction was substantially complete. A mixture of methyl methacrylate (38.3 parts) and ethyl acrylate (1.4 parts) was added, and the mixture

TABLE 1

| Stage | Parts of monomeric components | 1 | 2 | 3 | 4 | 5 | 6 | 7 | Commercial grade of polymethyl methacrylate for injection molding |
|---|---|---|---|---|---|---|---|---|---|
| A | Ethyl acrylate | 74.2 | 74.2 | 74.2 | 74.2 | 74.2 | 63.2 | 63.2 | |
| | Styrene | | | | | | | 11 | |
| | Acrylonitrile | | | | | | 11 | | |
| | Glycol dimethacrylate | 0.8 | 0.8 | 0.8 | 0.8 | 0.8 | 0.8 | 0.8 | |
| B | Methyl methacrylate/ethyl acrylate (97:3) mixture | 0 | 9.0 | 19 | 38.0 | 75.0 | 19 | 19 | |
| C | do | 925 | 916 | 906 | 887 | 850 | 906 | 906 | |
| | Softening point (Vicat), °C | 106.8 | 109.2 | 107.6 | 105.5 | 107.1 | 111.1 | 110.2 | 110 |
| | Percent area of molding crazed | 15 | 10 | 19 | 23 | 30 | 13 | 50 | 100 |
| | Energy to break, ft.-lb./in.$^3$ | 32 | 50 | 45 | 47 | 24 | 15 | 23 | 25 |
| | Flexural strength, ×10$^{-3}$, p.s.i. | 17.5 | 19.8 | 19.6 | 20.4 | 15.0 | 12.7 | 15.4 | 16.5 |
| | Rockwell M hardness | 78 | 79 | 80 | 79 | 78 | 83 | 81 | 98 |
| | Percent transmission: 4,000 A | Opaque→Translucent | | | | | ca. 60 | 72 | 96 |
| | 6,000 A | | | | | | | 86 | 92 |

EXAMPLE II

Stage A

To water (1,000 parts) containing sodium lauryl sulphate (1 part) and potassium persulphate (0.5 part) was added a mixture of ethyl acrylate (163 parts) and triethylene glycol dimethacrylate (1.6 parts). The stirred mixture was heated slowly to reflux under a stream of nitrogen.

Stage B

When the polymerization reaction was substantially complete a mixture of methyl methacrylate (38.5 parts) and ethyl acrylate (1.2 parts) was added and the mixture raised again to reflux temperature and maintained there for 1 hour.

The mixture was cooled by the addition of water (1,000 parts) containing disodium hydrogen phosphate (1 part), monosodium dihydrogen phosphate (5.8 parts) and sodium polymethacrylate (1,225 parts), followed by a mixture of methyl methacrylate (1,225 parts), ethyl acrylate (39.0 parts), lauroyl peroxide (7 parts) and tert-dodecyl mercaptan (13 parts). The mixture was held at 80–85° for 1 hour, heated to 100° for 10 minutes and finally cooled and centrifuged. The granular product was dried and injection molded. Translucent moldings of good surface finish were obtained having a Vicat softening point of 109.9° C., and which did not craze when subjected to the detergent test.

EXAMPLE IV

Stage A

To water (1,000 parts) containing sodium oleate (40 parts), disodium hydrogen phosphate (10 parts) and ammonium persulphate (0.5 part) were added 50 parts of a mixture of n-butyl acrylate, acrylonitrile and divinyl benzene (present in the weight ratio 84:14:2 respectively). After maintaining the mixture at 82–85° C. for 1 hour the polymerization reaction was substantially complete.

Stage B

The mixture was then cooled to 60° C. and 50 parts of a mixture containing 97% methyl methacrylate and 3% ethyl acrylate added. This was completely polymerized after a further half hour at 82–85° C.

Stage C

The cooled mixture was diluted with water (1,000 parts) containing disodium hydrogen phosphate (1 part), sodium dihydrogen phosphate (5 parts), the sodium salt of a 50:50 copolymer of methyl methacrylate and maleic anhydride (0.6 part) and sufficient of the methyl methacrylate/ethyl acrylate mixture described as in Stage B was added to raise the total organic phase (i.e. monomer plus polymer) to 1,000 parts. In the final monomer mixture added were dissolved tert-dodecyl mercaptan (10 parts), stearyl alcohol (10 parts) and lauroyl peroxide (4 parts). The stirred suspension was then heated to 80–85° C. for 1½ hours after which time the product was isolated as fine granules (weight average particle size 150 microns). On injection molding, translucent, pale yellow moldings were obtained with the following properties:

Vicat softening point _____ 101.7° C.
Crazed by detergent test _____ Nil

EXAMPLE V

To water (7,460 parts) in a stirred autoclave, containing sodium dodecyl benzene sulphonate (7.46 parts) and potassium persulphate (2.24 parts) was added ethyl acrylate (1,216 parts) and glycol dimethacrylate (6.2 parts). The vessel was purged free of oxygen by means of nitrogen. The mixture was heated to 60° C. and an exothermic reaction ensued; when this had subsided the contents of the vessel were heated to 80° C. and there was added a mixture of methyl methacrylate (223 parts), ethyl acrylate (7.2 parts) and glycol dimethacrylate (4.6 parts). After maintaining the reaction mixture at 80° C. for 30 minutes, the resultant polymer latex (designated "Latex A") was cooled and used to prepare further polymers.

In the preparation of these further polymers various amounts of Latex A were reacted with various amounts of methyl methacrylate, ethyl acrylate and tert-dodecyl mercaptan and lauroyl peroxide. In each case the various ingredients were mixed together in a stirred autoclave and a solution of aluminum sulphate in water (50 parts) was added. Specific amounts of all the added ingredients are shown in the table given hereinafter. After 10 minutes further stirring at 20° C. there was added further water (50 parts) containing sodium polymethacrylate (1.8 parts), disodium hydrogen phosphate (2 parts) and sodium dihydrogen phosphate (6 parts). The whole mixture was then heated to 80° C., and after a further 75 minutes when the exothermic reaction had subsided, the contents of the vessel were heated to 100° C. for 20 minutes, then cooled, and the granular polymeric product produced was isolated by centrifuging, washed and dried.

This granular product could be colored by simply tumbling with pigments and the product thus obtained when molded gave homogeneously colored articles. The unpigmented material gave translucent moldings with substantially better craze and impact resistance than unmodified polymethyl methacrylate as is shown in the following table:

| Latex A, parts | 4,540 | 6,500 | 7,750 | Polymethy-methacl rylate |
|---|---|---|---|---|
| Methyl methacrylate | 2,780 | 2,460 | 2,250 | |
| Ethyl acrylate | 85 | 75.2 | 68.8 | |
| Lauroyl peroxide | 8.8 | 7.8 | 7.1 | |
| Tert-dodecyl mercaptan | 47.2 | 40 | 36.1 | |
| Aluminum sulphate | 1.0 | 1.5 | 1.8 | |
| Vicat softening point, °C | 113 | 110 | 108 | 110 |
| Pencil hardness H | 6 | 4 | 3 | 9 |
| Percent crazed by 1% detergent solution | Nil | Nil | Nil | 90 |
| Falling weight impact strength, ft. lb | 2.0 | 4.3 | 8.8 | 0.4 |
| Izod impact strength, ft. lb. inch⁻¹ notch | 0.48 | 0.64 | 0.88 | 0.39 |

EXAMPLE VI

To water (7,460 parts), in a stirred autoclave, containing sodium dodecyl benzene sulphonate (7.46 parts) and potassium persulphate (2.24 parts) was added ethyl acrylate (1,216 parts) and glycol dimethacrylate (6.2 parts). The vessel was purged free of oxygen by means of nitrogen. The mixture was heated to 60° C. and an exothermic reaction ensued; when this reaction had subsided the mixture was heated to 100° C. for 10 minutes, then cooled to 76° C. and a mixture of methyl methacrylate (113 parts) and ethyl acrylate (3.6 parts) was added. After holding at 80° C. for 10 minutes the mixture was heated to 100° C. for 10 minutes, and then cooled to room temperature. The product was a latex, designated "Latex B" and was used to prepare further polymers.

In the preparation of each of these further polymers, to 4,540 parts of Latex B were added 2,684 parts of methyl methacrylate and 298 parts of various other comonomers, together with lauroyl peroxide (9 parts) and tert-dodecyl mercaptan (42 parts). The particular comonomers added are given in the table hereinafter shown. There was then added water (1,500 parts) containing sodium polymethacrylate (1.7 parts), disodium hydrogen phosphate (1.5 parts) and sodium dihydrogen phosphate (5 parts). The whole mixture was stirred and heated to 80° C. and after 1 to 2 hours polymerization was virtually complete. After heating to 95° C. for 20 minutes, the mixture was cooled and the granular polymeric product was isolated by centrifuging, washing and drying.

The polymeric granules gave translucent materials of excellent surface finish and hardness when injection molded which were not crazed by aqueous detergents. All the molding were significantly tougher than moldings made from polymethyl methacrylate.

The following table shows the particular comonomers used in making these polymers and the Vicat softening points, pencil hardness and falling weight impact strength of the materials:

| Comonomer added to Latex B and methyl methacrylate | Vicat softening point, °C. | Pencil hardness H | Falling weight impact strength ft. lb. |
|---|---|---|---|
| Butyl acrylate | 88 | 4–5 | 4.7 |
| 2-ethyl hexyl acrylate | 94 | 4–5 | 5.4 |
| No comonomer added | 110 | 6–7 | 2 |
| Molding made from polymethyl methacrylate | 110 | 9 | 0.4 |

"Pencil hardness" is that grade of pencil required to just scratch the surface of injection moldings. Pencils made by "British Pens Ltd.," The Cumberland Pencil Company, Keswick, England, were used in this test.

What is claimed is:

1. A polymeric product having improved resistance to breakage on impact obtained by suspension polymerizing at a temperature of about 40 to about 140° C., in aqueous dispersion, and in the presence of a monomer soluble catalyst monomeric material selected from the group consisting of:

monomeric material (C) which is methyl methacrylate
together with from 0 to 15% by weight of (C) of at
least one lower alkyl acrylate in which the alkyl
moiety of the ester molecule contains from 1 to 8
carbon atoms,
and 0 to 5% of at least one copolymerizable monoethylenically unsaturated compound containing at
least two

groups per molecule selected from the group consisting of glycol dimethacrylate, divinyl benzene, vinyl
methacrylate, methylene dimethacrylate, allyl methacrylate, diallyl phthalate, diallyl maleate, allyl acrylate, methallyl acrylate,
in the presence of a cross-linked copolymer Y selected
from the group consisting of:
(1) polymers obtained by polymerizing to substantial
completion of aqueous emulsion polymerization in
the presence of water soluble catalyst of said monomeric material (C) in the presence of a polymer X
obtained by polymerizing a monomer mixture (A),
consisting essentially of:
(a) at least one lower alkyl acrylate containing
from 1 to 8 carbon atoms in the alkyl moiety of
the ester molecule,
(b) 0 to 50% by weight of said alkyl ester of
another different copolymerizable monoethylenically unsaturated compound, and
(c) from 0.1 to 10% by weight of total monoethylenically unsaturated monomer of (A) at
least one copolymerizable compound containing at least two

groups per molecule selected from the group
consisting of glycol dimethacrylate, divinyl benzene, vinyl methacrylate, methylene dimethacrylate, allyl methacrylate, diallyl phthalate, diallyl
maleate, allyl acrylate, methallyl acrylate,
(2) polymers obtained by polymerizing to substantial
completion by aqueous emulsion polymerization in
the presence of a water soluble catalyst of said monomer mixture (A) in the presence of a polymer obtained by polymerizing said monomeric material (C),
the polymeric product containing 5 to 50% of material derived from said monomer mixture (A).

2. A polymeric product as set forth in claim 1 containing 10–30% of said monomer mixture (A).

3. A polymeric product as set forth in claim 1 obtained
by polymerizing said monomeric material (C) in the
presence of one of said cross-linked copolymers (1)
and (2), the monomer (C) consisting at least mainly
of the same monoethylenically unsaturated monomer as
is present in said cross-linked copolymers (1) and (2),
other than of said monomeric mixture (A).

4. A polymeric product as set forth in claim 1 in
which said alkyl ester of acrylic acid is methyl acrylate.

5. A polymeric product as set forth in claim 1 in which
said alkyl ester of acrylic acid is ethyl acrylate.

6. A polymeric product as set forth in claim 1 in
which said alkyl ester of acrylic acid is propyl acrylate.

7. A polymeric product as set forth in claim 1 in
which said alkyl ester of acrylic acid is butyl acrylate.

8. A polymeric product as set forth in claim 1 in which
said alkyl ester of acrylic acid is 2-ethyl hexyl acrylate.

9. A polymeric product as set forth in claim 1 in
which said monomer material (A) contains 0.1 to 5%
by weight of said copolymerizable ethylenically unsaturated compound containing at least two

groups per molecule.

10. A polymeric product as set forth in claim 9 in
which said monomer mixture (A) contains, as the alkyl
ester of acrylic acid, ethyl acrylate.

11. A polymeric product as set forth in claim 1 in
which said monomeric material (C) is polymerized in the
presence of said cross-linked copolymer (1), and, in said
cross-linked copolymer (1) there are, for each 100 parts
by weight of said lower alkyl acrylate, from 10 to 300
parts by weight of other copolymerizable monoethylenically unsaturated monomer.

12. A polymeric product as claimed in claim 1 in
which said monomeric material (C) in said cross-linked
copolymer contains about 1 to about 15% by weight of
at least one lower alkyl acrylate in which the alkyl moiety
of the ester molecule contains from 1 to 8 carbon atoms.

13. A polymeric product as claimed in claim 12 in
which said monomeric material (C) in said graft copolymers contains up to 5.0% by weight of said copolymerizable monoethylenically unsaturated compound containing at least two

groups per molecule.

14. The method of making a polymeric product having improved resistance to breakage on impact which
comprises suspension polymerizing at a temperature of
about 40 to about 140° C. in aqueous dispersion and in
the presence of monomer soluble catalyst a material
selected from the group consisting of:
monomeric material (C) which is methyl methacrylate
together with from 0 to 15% by weight of (C) at
least one lower alkyl acrylate in which the alkyl
moiety of the ester molecule contains from 1 to 8
carbon atoms,
and 0 to 5% of at least one copolymerizable monoethylenically unsaturated compound containing at
least two

groups per molecule selected from the group consisting of glycol dimethacrylate, divinyl benzene,
vinyl methacrylate, methylene dimethacrylate, allyl
methacrylate, diallyl phthalate, diallyl maleate, allyl
acrylate, methallyl acrylate,
in the presence of a cross-linked copolymer Y selected
from the group consisting of:
(1) polymers obtained by polymerizing to substantial
completion by aqueous emulsion polymerization in
the presence of water soluble catalyst of said monomeic material (C) in the presence of a polymer X
obtained by polymerizing a monomer mixture (A),
consisting essentially of:
(a) at least one alkyl ester of acrylic acid containing from 1 to 8 carbon atoms in the alkyl
moiety,
(b) 0 to 50% by weight of said alkyl ester of
another different copolymerizable monoethylenically unsaturated compound, and
(c) from 0.1 to 10% by weight of total monoethylenically unsaturated monomer of (A) at
least one copolymerizable compound containing
at least two

groups per molecule selected from the group
containing of glycol dimethacrylate, divinyl
benzene, vinyl methacrylate, methylene dimethacrylate, allyl methacrylate, diallyl phthalate,
diallyl maleate, allyl acrylate, methallyl acrylate,
(2) polymers obtained by polymerizing to substantial
completion by aqueous emulsion polymerization in
the presence of water soluble catalyst of said monomer mixture (A) in the presence of a polymer obtained by polymerizing said monomeric material (C), the polymeric product containing 5 to 50% of material derived from said monomer mixture (A), and separating the final polymeric product from said aqueous dispersion.

15. The method of making a polymeric product as set forth in claim 14 in which said aqueous dispersion is stabilized by a dispersing agent.

16. The method of making a polymeric product as set forth in claim 14 in which said polymerization in aqueous dispersion is carried out at 70–90° C.

17. The method of making a polymeric product as set forth in claim 14 in which said aqueous dispersion contains 0.05 to 1.0% by weight of a chain transfer agent based upon the weight of polymerizable materials.

18. The method of making a polymeric product as set forth in claim 14 in which the polymer in the presence of which the polymerization in aqueous dispersion is carried out is present in droplets of dispersed monomeric material.

19. The method of making a polymeric product as set forth in claim 14 including the step of preparing said aqueous dispersion by stirring monomeric material in a stable aqueous latex of the polymer in the presence of which the dispersion polymerization is carried out.

References Cited

UNITED STATES PATENTS 3,041,309 6/1962 Baer _____ 260—885
3,251,904 5/1966 Souder et al. _____ 260—885

MURRAY TILLMAN, Primary Examiner.
JOHN T. GOOLKASIAN, Assistant Examiner.

U.S. Cl. X.R.
260—875, 879, 881